United States Patent
Kato

(10) Patent No.: US 6,646,674 B1
(45) Date of Patent: Nov. 11, 2003

(54) TV TELEPHONE SYSTEM

(75) Inventor: Tatsuya Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 410 days.

(21) Appl. No.: 09/716,354

(22) Filed: Nov. 21, 2000

(30) Foreign Application Priority Data

Nov. 25, 1999 (JP) .......................................... 11-334657

(51) Int. Cl.7 ............................................... H04N 7/14
(52) U.S. Cl. .................. 348/14.13; 348/14.01
(58) Field of Search .......................... 348/14.01–14.02, 348/14.07–14.15, 384.1, 385.1, 397.1, 398.1, 399.1, 400.1; 709/203–204, 219; 375/240, 240.01–240.07, 240.12–240.16, 240.26–240.28; 345/753; 370/260–263, 395.5–395.53

(56) References Cited

U.S. PATENT DOCUMENTS

| | | | | | |
|---|---|---|---|---|---|
| 5,144,425 A | * | 9/1992 | Joseph | ................... | 375/240.05 |
| 5,481,312 A | * | 1/1996 | Cash et al. | ............ | 375/240.28 |
| 5,831,666 A | * | 11/1998 | Palmer et al. | ........... | 348/14.12 |
| 5,966,164 A | * | 10/1999 | Gotoh et al. | ............. | 348/14.01 |
| 6,014,381 A | * | 1/2000 | Troxel et al. | .......... | 370/395.52 |
| 6,014,694 A | * | 1/2000 | Aharoni et al. | ............. | 709/219 |
| 6,026,080 A | * | 2/2000 | Roy | ........................... | 370/260 |
| 6,198,500 B1 | * | 3/2001 | Watanabe et al. | ........... | 725/105 |

FOREIGN PATENT DOCUMENTS

| | | |
|---|---|---|
| JP | 11-17843 | 1/1999 |
| JP | 10-11381 | 1/2001 |

* cited by examiner

*Primary Examiner*—George Eng
(74) *Attorney, Agent, or Firm*—Whitham, Curtis & Christofferson, P.C.

(57) ABSTRACT

In a TV telephone system, a video compression section performs interframe predictive encoding of a video signal captured by a video camera, so as to generate INTRA video data and INTER video data. In the case in which the video compression section generates INTRA video data, the INTRA video data is performed TCP protocol processing by a TCP section, and in the case in which the video compression section generates INTER video data, the INTER is performed UDP protocol processing by a UDP section. The result is that communication of INTRA video data is performed using the TCP protocol and communication of INTER video data is performed using the UDP protocol.

6 Claims, 6 Drawing Sheets

TV TELEPHONE SYSTEM

BACKGROUND OF THE INVENTION

1. Field of the Invention

The present invention relates to a TV telephone system having a plurality of TV telephone apparatuses communicating by video signals and audio signals via an Internet protocol network.

2. Related Art

In a TV telephone system of the past, communication by video and audio signals was conducted between TV telephone apparatuses via an internet protocol network such as an intranet or an internet.

In a TV telephone system, communication is conducted using video and audio signals, based for example on the Recommendation H.323 or H.225 of the International Telecommunication Union Telecommunication Standardization Sector (ITU-T).

A TV telephone apparatus used in a TV telephone system of the past is described below.

FIG. 6 of the accompanying drawings is a block diagram showing the example of the configuration of a TV telephone apparatus used in a TV telephone of the past.

The TV telephone apparatus 100 in this example of prior art conducts communication using a video signal and an audio signal via a network 114, with a TV telephone apparatus (not shown in the drawing) having the same configuration as the TV telephone apparatus 100.

As shown in FIG. 6, the TV telephone apparatus 100 of the prior art is formed by an audio I/O section 101, an audio CODEC 102, a receiving path delay section 103, a video CODEC 104, a video I/O section 105, a user data application section 106, a system controller 107, a system controller unnumbered information (UI) section 111, an H.225 layer section 112, and a network interface 113.

The audio CODEC 102 performs compression and encoding processing of an audio signal received from the audio I/O section 101, so as to generate compressed audio data. The compressed audio data output from the audio CODEC 102 passes through the receiving path delay section 103, the H.225 layer section 112, the network interface 113, and the network 114 and is transmitted to the other party's TV telephone apparatus.

The audio CODEC 102 performs decompression and decoding of compressed audio data received from the other party's TV telephone apparatus via the network 114, the network interface 113, the H.225 layer section 112, and the receiving path delay section 113, so as to play back the audio signal to the audio I/O section 101, which outputs the audio signal output from the audio CODEC 102 to a speaker (not shown in the drawing) or the like.

At the audio CODEC 102, compression/decompression and encoding/decoding processing are performed in accordance with any one of ITU-T Recommendations G.711, G.722, G.723, G.728, and G.729.

The video CODEC 104 performs interframe predictive decoding of a video signal captured by a video camera (not shown in the drawing) at the video I/O section 105, so as to generate an output compressed image data. The compressed image data output from the video CODEC 104 is sent to the other party's TV telephone apparatus, via the receiving path delay section 103, the H.225 layer section 112, the network interface 113, and the network 114.

The video CODEC 104 performs decompression and decoding of compressed image data sent from the other party's TV telephone apparatus via the network 114, the network interface 113, the H.225 layer section 112, and the receiving path delay section 103, so as to generate a video signal and output to the video I/O section 105, which displays the video signal output from the video CODEC 104 on a display (not shown in the drawing).

In the video CODEC 104, interframe predictive coding of a video signal captured at the video I/O section 105 is performed, in accordance with any one of the ITU-T Recommendations H.261, and H.263, and the compressed video signal sent from the other party's TV telephone apparatus is expanded and decoded.

The ITU-T Recommendation H.261 (hereinafter referred to as simple H.261) is described below.

In H.261, intraframe coding (hereinafter referred to as INTRA) and interframe coding (hereinafter referred to as INTER) are both used as interframe predictive encoding.

Interframe predictive coding is coding in which data from an initial or previous frame is referenced when performing encoding processing, and intraframe coding is coding in which only data within the current frame is used in performing encoding processing.

For example, in the case in which there is little movement in the video signal captured by the video I/O section 105, because there is a large correlation with respect to previous and subsequent frames, interframe coding is performed. However, in the case in which there is a large amount of movement captured in the video signal at the video I/O section 105, because the correlation with respect to previous and subsequent frames is small, intraframe coding is used.

Thus, in H.261, in the case in which there is a large change between a frame being coded and an initial frame or a previous frame, intraframe coding, in which the data from the previous frame is not referenced, is performed. In coding other frames, the previous frame is referenced, and interframe coding is done.

In H.261, in the case of performing decompression and decoding of compressed image data that has been coded at the other party's TV telephone apparatus using inter frame coding, previous frame data is referenced when performing decompression and decoding, and in the case of performing decompression and decoding of compressed data that has been coded at the other party's TV telephone apparatus using intraframe coding decompression and decoding are performed using only the current frame.

H.263 is a partially improved version of H.261 for a general switched telephone network (GSTN) type of TV telephone system, and because features of interframe predictive coding and operation are very similar to H.261, it will not be described herein.

Therefore, compressed image data generated at the video CODEC 104 is a mixture of "INTRA" data without interframe predictive signals, obtained by intraframe coding and "INTER" data with interframe predictive signals, obtained by interframe coding.

The receiving path delay section 103, in the case in which there is a offset between the audio signal at the audio I/O section 101 and the video signal at the video I/O section 105, provides a delay so as to compensate for this offset by causing any one of the audio signal and the video signal to delay. The offset between the audio signal and the video signal is dependent upon communication condition over the transmission path between the TV telephone apparatus 100 and the TV telephone apparatus of the other party.

The user data application section 106 executes various applications that use the user data channel in the TV telephone apparatus 100.

With respect to the compressed audio data output from the audio CODEC 102 and the compressed image data output from the video CODEC 104, the H.225 layer section 112 adds an RTP (real time transfer protocol) header and performs UDP protocol processing (User Datagram Protocol), and also performs UDP protocol processing and removing the RTP header from compressed image data sent from the other party's TV telephone apparatus via the network 114 and the network interface 113.

The UDP protocol is a connectionless type of protocol (RFC 768) that has been standardized by the IETF (Internet Engineering Task Force), and is a type of communication protocol for the IP network such as Internet and intranet.

Because of the simplicity of the UDP protocol, it features superior data communication throughput, and provides an advantage in improving the simultaneity of image communication, making it suitable, for use in real-time communication of both audio and video signals.

FIG. 7 of the accompanying drawings is a block diagram showing an example of the configuration of the H.225 layer section 112 of FIG. 6.

In the configuration example shown in FIG. 7, the H.225 layer section 112 is formed by an RTP section 120, an RAS (Remote Access Service) section 121, a UDP layer section 122, a call signaling section 123, an H.245 section 124, a TCP (Transport Control Protocol) layer section 125, and an IP layer section 122.

The RTP section 120 adds an RTP header to compressed audio data output via the receiving path delay section 103 from the audio CODEC 102, and the compressed image data output via the receiving path delay section 103 from the video CODEC 104, and also removes the RTP header from compressed audio data output from the UDP layer section 122 and compressed image data output from the UDP layer section 122.

The compressed audio data from which the RTP header has been stripped at the RTP section 120 is output to the audio CODEC 102 via the receiving path delay section 103, and the compressed image data from which the RTP header has been stripped at the RTP section 120 is output to the video CODEC 104 via the receiving path delay section 103.

The RAS section 121 performs RAS data communications for management of the communication condition and bandwidth, in accordance with the ITU-T Recommendation H.223, with respect to a gatekeeper (not shown in the drawing) on the network 114.

The call signaling section 123 performs communication of call signaling data for making calls and connections and disconnecting with respect to the TV telephone apparatus of the other party, based on the ITU-T Recommendation H.225.

The H.245 section 124 performs H.245 data communication with the TV telephone apparatus of the other party, for the arbitration of the operating mode in accordance with the ITU-T Recommendation H.245.

The UDP layer section 122 performs UDP protocol processing to the RAS data output from the RAS section 121, and to compressed audio data and compressed image data to which an RTP header has been added at the RTP section 120, and outputs the resulting RAS data, compressed audio data, and compressed video data to the IP layer section 127.

The UDP layer section 122 performs UDP protocol processing to RAS data, compressed audio data and compressed image data sent from the TV telephone apparatus of the other party via the network 114, the network interface 113, and the IP layer section 127, and outputs the resulting compressed audio data and compressed image data to the RTP section 120, the UDP protocol processed RAS data being output to the RAS section 121.

The TCP layer 125 performs TCP protocol processing to call signaling data output from the call signaling section 108 and to H.245 data output from the H.245 section 124, and outputs the TCP protocol processed call signaling data and H.245 data to the IP layer section 127.

The TCP layer 125 performs TCP protocol processing to call signaling data and to H.245 data sent from the TV telephone apparatus of the other party via the network 114, the network interface 113 and IP layer section 127, and outputs the TCP protocol processed call signaling data to a call signaling section 123 and outputs H.245 data to the H.245 section 124.

The IP layer section 127 performs IP protocol processing to various data output from the TCP layer section 125 and the UDP layer section 122, this IP protocol processed data being sent, via the network interface 113 and the network 114, to the TV telephone apparatus of the other party.

The IP layer section 127 performs IP protocol processing to various data set from the TV telephone apparatus of the other party via the network 114, the network interface 113, and outputs the IP protocol processed call signaling data and the IP protocol processed H.245 data to the TCP layer section 125, and outputs compressed audio data, compressed image data and RAS data to the UDP layer section 122.

The system controller 107 is formed by a call controller 108 that exchanges call signaling signals with the call signaling section 123 so as to control the call signaling section 123, an H.245 controller 109 that performs exchange of an H.245 control signal with the H.245 section 124 so as to control the H.245 section, and an RAS controller 110 that performs exchange of an RAS control signal with the RAS section 121 so as to control the RAS section 121, thereby controlling the overall TV telephone apparatus 100.

The system control UI section 111 performs negotiation with the other party's TV telephone apparatus with regard to calling connection control and operating mode in accordance with a command from the system controller 107.

The network interface 113 sends various data output from the IP layer section 127 via the network 114 to the TV telephone apparatus of the other party, and receives various data sent from the TV telephone apparatus of the other party via the network 114, outputting the received data to the IP layer section 127.

The communication operation of the above-noted TV telephone apparatus for audio signals and video signals is described below.

In the system controller 107, call connection to the TV telephone apparatus of the other party, via the H.225 layer section 112, the network interface 113, and the network 114, is performed. When this is done, at the system control UI section 111, based on a command from the system controller 107, call connection control and negotiation with regard to the operating mode or the like are performed.

When the call connection with the TV telephone apparatus of the other party is established, communication operation for audio signals and video signals begins in the respective sections within the TV telephone apparatus 100.

The communication operation for an audio signal is as follows.

If an audio signal recorded by a microphone or the like at the audio I/O section 101 is to be sent to the TV telephone apparatus of the other party, the audio CODEC 102 performs compressing and encoding processing of the audio signal recorded at the audio I/O section 101, thereby generating compressed audio data, which is sent to the H.225 layer section 112, via the receiving path delay section 103.

In the H.225 layer section 112, an RTP header is added to the compressed audio data output from the audio CODEC 102 by the RTP section 120, and UDP protocol processing is performed by the UDP layer section 122.

Next, the compressed audio data that has been UDP protocol processed by the UDP layer section 122 is IP protocol processed by the IP layer section 127, after which it is sent, via the network interface 113 and the network 114, to the TV telephone apparatus of the other party.

In this example of prior art, the audio signal recorded by the audio I/O section 101 is compressed and encoded by the audio CODEC 102, after which it is UDP protocol processed by the UDP layer section 122, and further this compressed and UDP protocol processed audio data is sent to the TV telephone apparatus of the other party.

When playing back the compressed audio data sent from the TV telephone apparatus of the other party, the network interface 113 receives the compressed audio data.

In the H.225 layer section 112, the compressed audio data received in the network interface 113 is UDP protocol processed by the UDP layer section 122 and the RTP header thereof is removed by the RTP section 120, after which the compressed audio data without the RTP header is sent to the audio CODEC 102, via the receiving path delay section 103.

In the audio CODEC 102, the compressed audio data output from the H.225 layer section 112 via the receiving path delay section 103 is decompressed and decoded, thereby generating a decompressed and decoded audio signal, which is sent to the audio I/O section 101, which plays back the audio signal output from the audio CODEC 102 to a speaker or the like.

Next, the operation of communication with a video signal is described below.

In the case in which a video signal captured by a video camera or the like in the video I/O section 105 is to be sent to the TV telephone apparatus of the other party, in the video CODEC 104 compression and encoding processing is performed to the video signal captured at the video I/O section 105, thereby generating compressed image data, which is output to the H.225 layer section 112, via the receiving path delay section 103.

The compressed image data generated by the video CODEC 104 is a mixture of INTRA video data not containing interframe predictive coding, and INTER video data containing interframe predictive coding.

In the RTP section 120 of the H.225 layer section 112, an RTP header is added to the compressed image data output from the video CODEC 104, and UDP protocol processing is performed by the UDP layer 122 on the compressed image data.

Next, after the UDP protocol processing is performed to the compressed image data in the UDP layer section 122, IP protocol processing is performed to the UDP protocol processed compressed image data in the IP layer section 127, after which it is sent to the TV telephone apparatus of the other party, via the network interface 113 and the network 114.

In the above-noted example of prior art, a video signal obtained at the video I/O section 105 is compressed and encoded at the video CODEC 104, after which it is UDP protocol processed in the UDP layer section 122, and then IP protocol processed in the IP layer section 127, the resulting data being sent as compressed image data to the TV telephone apparatus of the other party.

When compressed image data sent from the TV telephone apparatus of the other part is to be displayed in the video I/O section 105, in the network interface 113 the compressed image data is received from the other party's TV telephone apparatus, via the network 114.

In the H.225 layer section 112, the compressed image data received by the network interface 113 is UDP protocol processed by the UDP layer section 122, and the RTP header is removed therefrom by the RTP section 120, after which the compressed image data, from which the RTP header has been stripped, is output to the video CODEC 104, via the receiving path delay section 103.

When this is done, in the receiving path delay section 103, in the case in which there is an offset in timing between the compressed audio data input to the audio CODEC 102 and the compressed image data input to the video CODEC 104, a delay is imparted to either the compressed audio data or the compressed image data, thereby compensating for this offset.

In the video CODEC 104, decompression and decoding are performed of the compressed image data output from the H.225 layer 112 via the receiving path delay section 103, thereby generating a video signal, which is output to the video I/O section 105, at which the video signal output from the video CODEC 104 is displayed on a display or the like.

In a TV telephone system of the past as described above, interframe predictive coding processing to compressed image data is performed, and communication of compressed image data is performed using the UDP protocol.

While the UDP protocol has the advantage of providing superior throughput of communication, because it does not provide error correction and retransmission control when a communication error occurs, part of the compressed data can be corrupted when received and, in the case in which part of the compressed image data is corrupted, there is a great disturbance of the displayed image.

In the case in which the compressed image data is INTRA video data in particular, because INTRA video data has a greater amount of information than INTER video data, when receiving INTRA video data, there is the possibility that part of the INTRA video data becomes corrupted.

Additionally, because decompression and decoding of INTER video data is done by referencing data from a previous frame, in the case in which the data from the previous frame has been corrupted, so that the screen display is disturbed, the displayed image will continue to be disturbed.

Thus, in a TV telephone system of the past, once the displayed image becomes corrupted, this corrupted image continues for a long period of time.

Accordingly, in view of the above-described drawbacks of the prior art, it is an object of the present invention to provide a TV telephone system in which the image displayed on a TV telephone apparatus is not disturbed for a long period of time, in the case in which compressed image data is sent via the IP network to the TV telephone apparatus.

SUMMARY OF THE INVENTION

In order to achieve the above-noted object, the present invention adopts the following basic technical constitution.

Specifically, the first aspect of the present invention is a TV telephone system in which encoding processing is performed on an audio signal so as to generate compressed audio data, and interframe predictive encoding processing is performed on a video signal, so as to generate INTRA video data not including interframe predictive coding signal and INTER video data including interframe predictive coding signal, the system having a plurality of TV telephone apparatuses which perform mutual communication with each other, via an IP network, using the compressed audio data, INTRA video data and INTER video data, wherein the TV telephone apparatuses of the TV telephone system perform INTRA video data communication using the TCP protocol.

In the second aspect of the present invention, the TV telephone apparatus comprise a microphone for capturing an audio signal; an audio signal compression section which generates the compressed audio data by performing audio compression and encoding of the audio signal captured by the microphone; a video camera for capturing a video signal; a video signal compression section which generates both the INTRA video data and the INTER video data by performing interframe predictive encoding for each new frame of the video signal captured by the video camera; a UDP section which performs UDP protocol processing of the compressed audio data output from the audio signal compression section, and which performs UDP protocol processing of INTER video data output from the video signal compression section, and which performs UDP protocol processing of a compressed audio data and INTER video data received via the IP network; a TCP section which performs TCP protocol processing of the INTRA video data output from the video signal compression section, and which performs TCP protocol processing of an INTRA video data received via the IP network; an IP section which performs IP protocol processing of the compressed audio data and the INTER video data output from the UDP section and the INTRA video data output from the TCP section, and which performs IP protocol processing of the compressed audio data, the INTRA video data and the INTER video data received via the IP network and output the compressed audio data and the INTER video data to the UDP section and output the INTRA video data to the TCP section; and a video decompression section which performs decompression and decoding of the INTER video data output from the UDP section and the INTRA video data output from the TCP section.

In the third aspect of the present invention, the video signal compression section comprises a video compression and encoding section, which performs interframe predictive encoding for each frame of a video signal captured by the video camera, thereby generating and outputting either INTRA video data or INTER video data, and which also outputs an INTRA/INTER identification signal, in synchronization with a generation of the INTRA video data and the INTER video data; and a switch, which, in resp0opnse to the INTRA/INTER identification signal, causes INTRA video data output to the TCP section and causes the INTER video data output to the UDP section.

In the fourth aspect of the present invention, the video decompression section comprises an adder, in which the INTRA video data output from the TCP section and INTER video data output from the UDP section are added; and a video decompression and decoding section, which performs decompression and decoding of the INTER video data and the INTRA video data added by the adder, so as to reproduce a video signal.

The sixth aspect of the present invention is a TV telephone system in which encoding processing is performed on an audio signal so as to generate compressed audio data, and frame differential image encoding processing is performed on a video signal, so as to generate INTRA macroblock data and INTER macroblock data, the system having a plurality of TV telephone apparatuses, which perform mutual communication with each other, via an IP network, using the compressed audio data, the INTRA macroblock data, and the INTER macroblock data, wherein the TV telephone apparatuses perform communication of the INTRA macroblock data using a TCP protocol, and performs communication of the INTER macroblock data using UDP protocol.

In the present invention configured as described above, in the case in which communication is performed between TV telephone apparatuses with a video signal and an audio signal, INTRA video data generated by performing interframe predictive encoding of a video signal is communicated by means of the TCP protocol.

By doing this, when performing communication of INTRA video data, because error correction and resend control is performed by the TCP protocol, data is not corrupted when receiving INTRA video data. Additionally, because decompression and decoding processing is performed of the INTRA video data without referencing a previous frame, the image of the INTRA video data is not disturbed.

In the case in which communication of INTER video data is done using the UDP protocol, in addition to improving the simultaneity of the image communication, even should part of the INTER video data become corrupted, when the next INTRA data is received, because the image is restored to a proper image, the image is not disturbed for a long period of time.

BRIEF DESCRIPTIONS OF THE DRAWINGS

Figure 2:
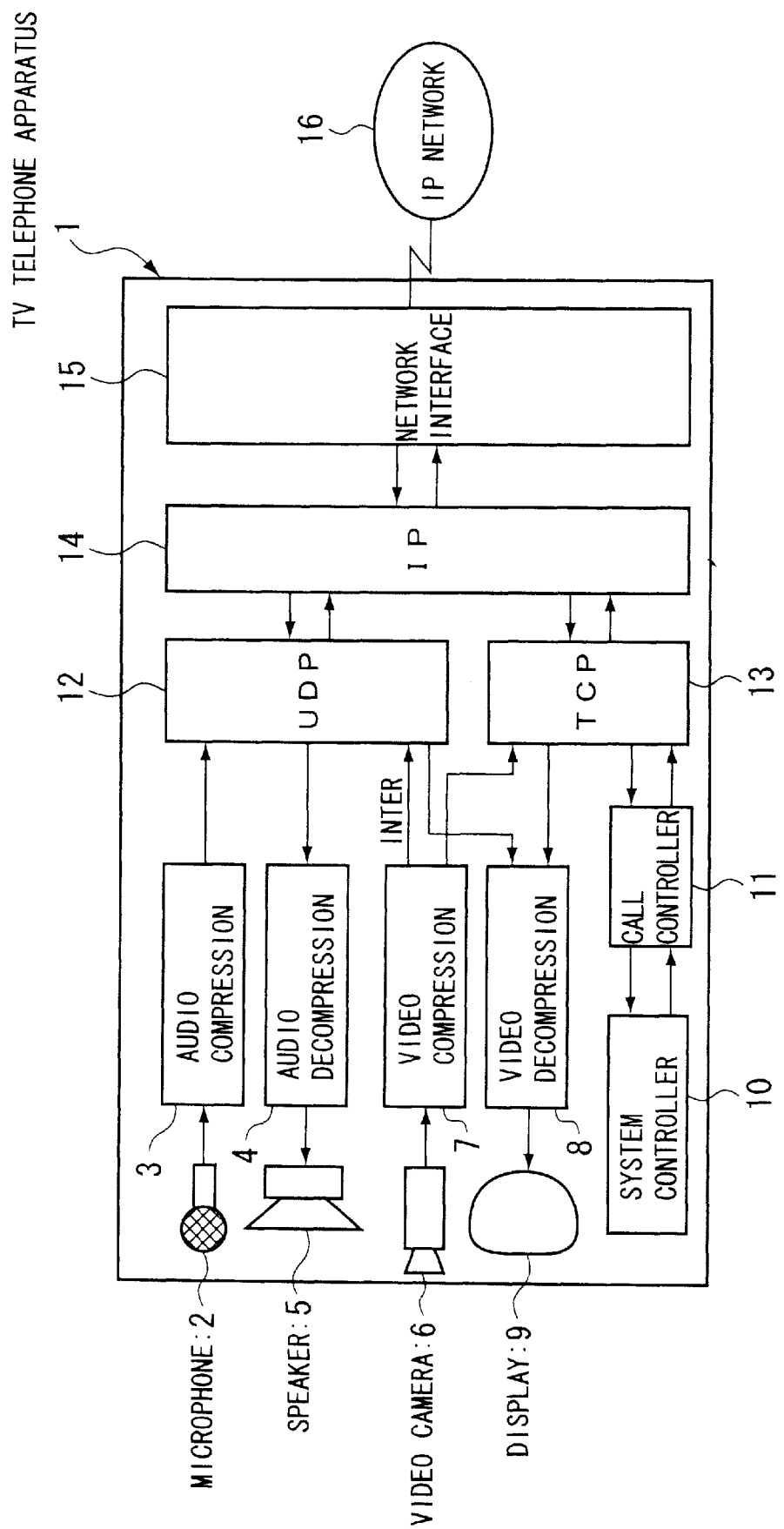
FIG. 2 is a block diagram showing an example of the configuration of the TV telephone system of FIG. 1.

FIG. 5(a) is a drawing illustrating the condition of the image displayed on the TV telephone apparatus of FIG. 2, FIG. 5(b) is a drawing illustrating the condition of the image displayed on a TV telephone apparatus used in TV telephone system of the prior art, and FIG. 5(c) is a drawing illustrating the condition of the image displayed on a TV telephone apparatus in the case in which communication of INTRA video data and INTER video data between TV telephone apparatuses are both conducted using the TCP protocol.

Figure 6:
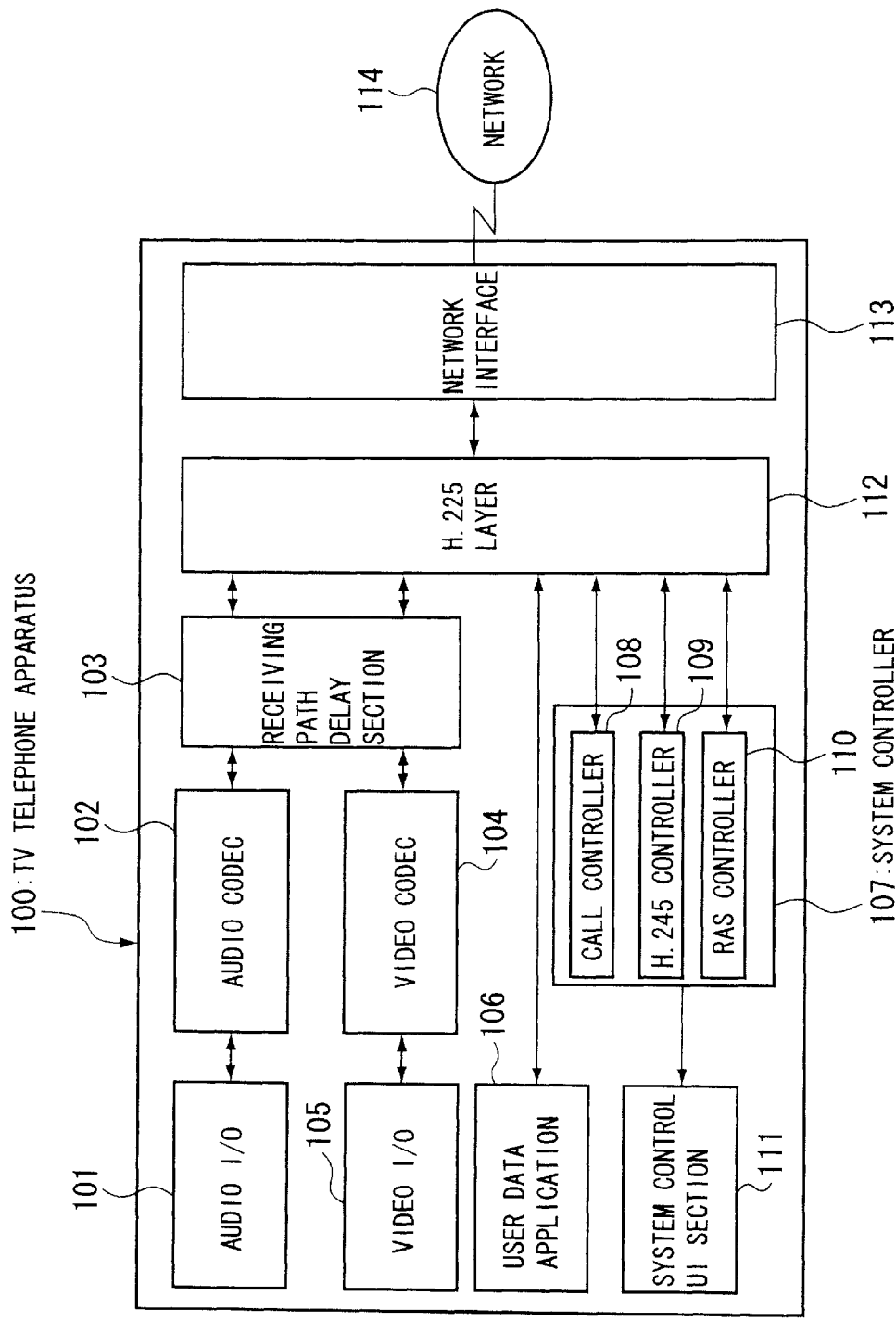

FIG. 6 is a block diagram showing an example of a TV telephone apparatus used in a TV telephone system of the prior art.

Figure 7:
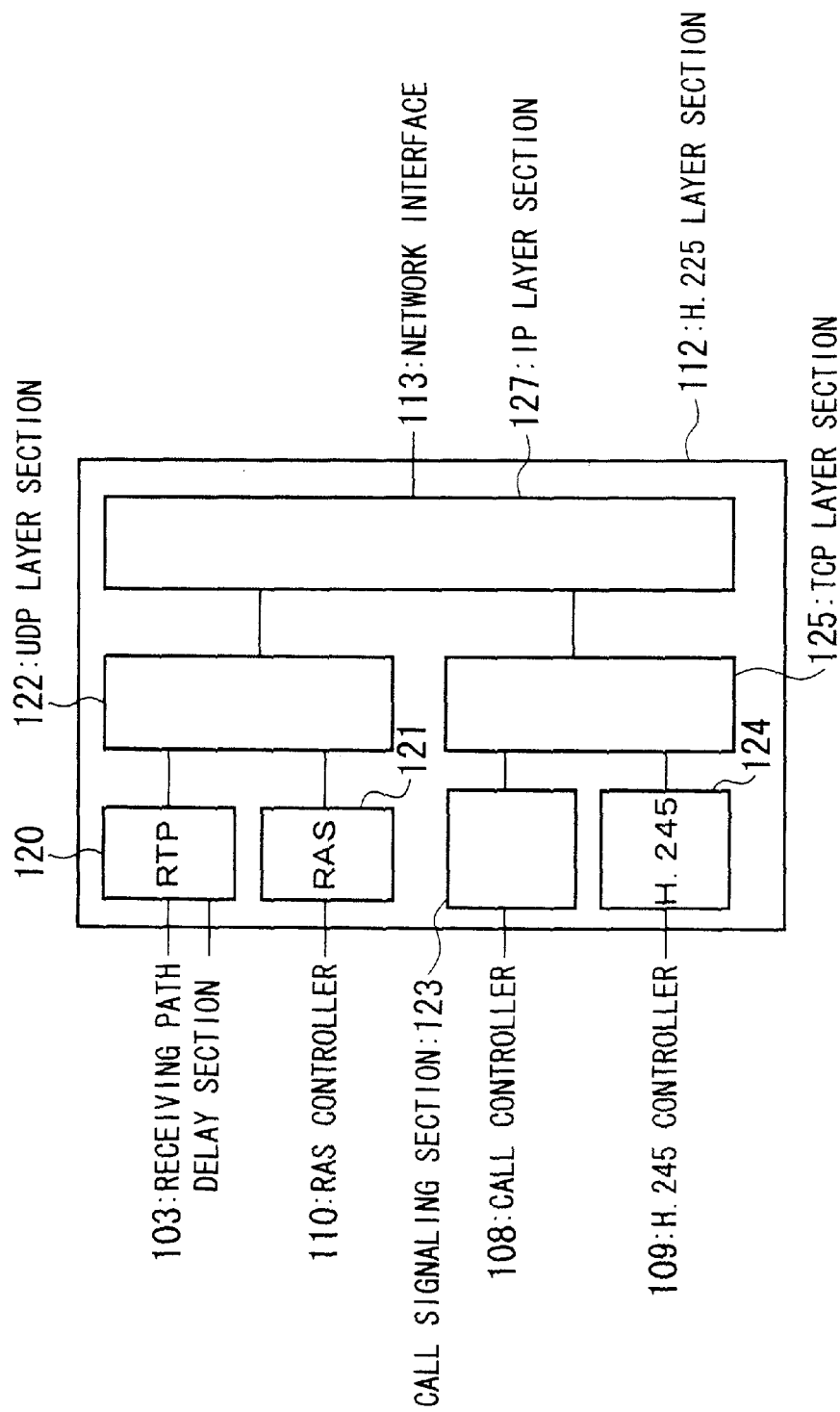

FIG. 7 is a block diagram showing an example of the configuration of the H.225 layer section shown in FIG. 6.

DETAILED DESCRIPTION OF THE PREFERRED EMBODIMENTS

Embodiments of a TV telephone system according to the present invention are described in detail below, with references made to relevant accompanying drawings.

Figure 1:
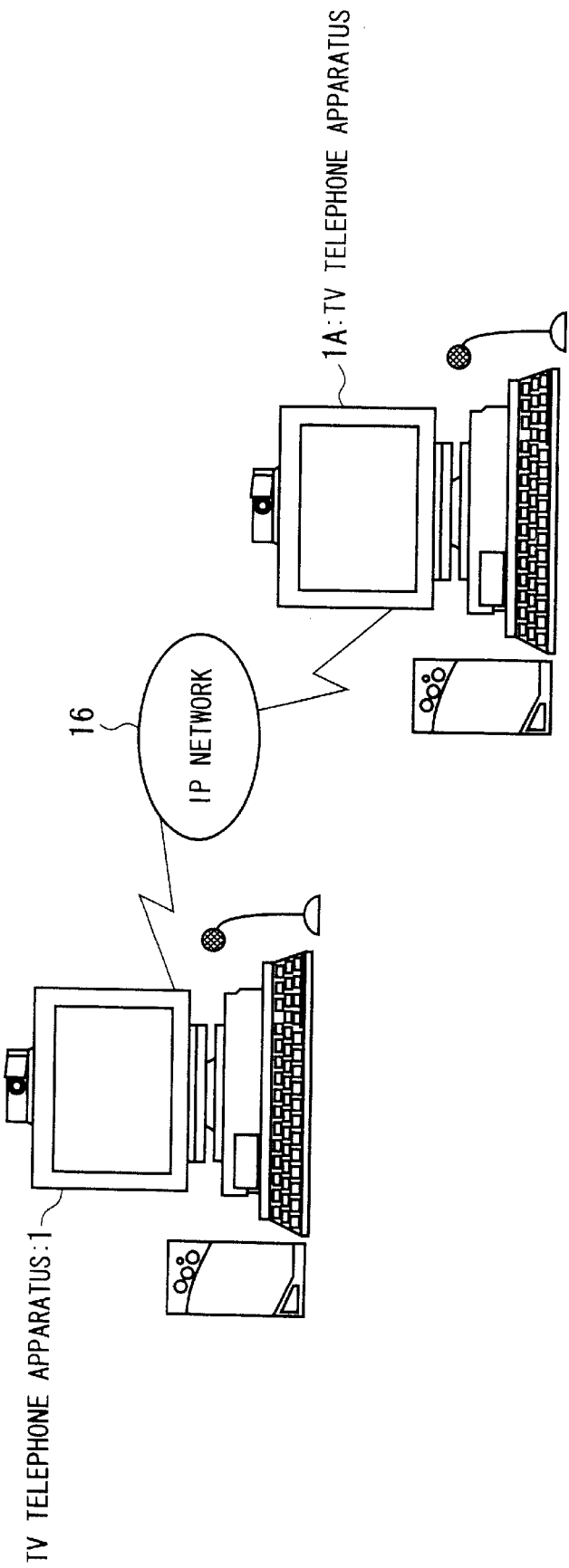
FIG. 1 is a drawing showing an embodiment of a TV telephone system according to the present invention.

Specifically, FIG. 1 shows an embodiment of a TV telephone system according to the present invention.

In the embodiment shown in FIG. 1, in the TV telephone apparatuses 1 and 1A, mutual communication by an audio signal and a video signal is conducted using an IP network such as the Internet or an intranet.

FIG. 2 is a block diagram showing an example of the configuration of the TV telephone apparatus 1 shown in FIG. 1. Although the configuration of the TV telephone apparatus 1 will be described below, it will be understood that the configuration of the other TV telephone apparatus 1A is the same configuration as the TV telephone apparatus 1.

The TV telephone apparatus 1 shown in FIG. 2 is formed by a microphone 2, an audio compression section 3, an audio decompression section 4, a speaker 5, a video camera 6, a video compression section 7, a video decompression section 8, a display 9, a system controller 10, a call controller 11, a UDP section 12, a TCP section 13, an IP section 14, and network interface 15.

The audio compression section 3 performs audio compression and encoding of an audio signal received by the microphone 2, thereby generating and outputting a compressed audio signal.

The video compression section 7 performs interframe predictive encoding for each frame of a video signal captured by the video camera 6, thereby generating and outputting a compressed video signal. In the video compression section 7, the interframe predictive encoding processing includes intraframe encoding and interframe encoding.

Therefore, the compressed video data generated by the video compression section 7 has a mixture of INTRA video data generated by intraframe encoding processing and INTER video data generated by interframe encoding. By doing this, the INTRA video data does not include interframe predictive coding signal and the INTER video data includes interframe predictive coding signal.

The system controller 10 performs control of the overall TV telephone apparatus 1.

The call controller 11, based on a command from the system controller 10, performs call control signal communication with a call control section (not shown in the drawing) provided within the TV telephone apparatus 1A, for the purpose of conducting call connections and disconnections with the TV telephone apparatus 1A.

The UDP section 12 performs UDP protocol processing of compressed audio data output from the audio compression section 3 and INTER video data output from the video compression section 7, and outputs UDP protocol processed compressed audio data and INTER video data to the IP section 14.

The UDP section 12 also performs UDP protocol processing of compressed audio data and INTER video data sent by the TV telephone apparatus 1A and received by the TV telephone apparatus 1, via the IP network 16, the network interface 15, and the IP section 14, and outputs the UDP protocol processed compressed audio data to the audio decompression section 4, and also outputs the UDP protocol processed INTER video data to the video decompression section 8.

The UDP protocol is, as described above, a simple protocol, which features a high data communication throughput and an improvement in the simultaneity of image communication.

The TCP section 13 performs TCP protocol processing of INTRA video data output from the video compression section 7 and a call control signal output from the call controller 11, and outputs the TCP protocol processed INTRA video data and call control signal to the IP section 14.

The TCP section 13 also performs TCP protocol processing of INTRA video data and call control signal sent from the TV telephone apparatus 1A and received by the TV telephone apparatus 1 via the IP network 16, the network interface 15, and the IP section 14, outputting the TCP protocol processed INTRA video data to the video decompression section 8 and outputting the TCP protocol processed call control signal to the call controller 11.

The TCP protocol is a connection-type protocol standardized by the IETF (RFC 793), and is one type of communication protocol used in an IP network such as the Internet or an intranet.

Because the TCP protocol performs error correction and resend control during communication, compared with the UDP protocol it provides data communication of a higher reliability.

In the present invention, based on the above-described UDP protocol and TCP protocol, INTRA video data communication is performed using the TCP protocol, and INTER video data communication is performed using the UDP protocol.

For this reason, when performing INTRA video data communication, error correction and resend control are performed by the TCP protocol, thereby preventing corruption of the INTRA video data and providing reliable reception. Because decompression and decoding processing of INTRA video data is performed, without referencing a previous frame, the displayed image of INTRA video data is not disturbed.

Because INTER video data communication is performed using the UDP protocol, it is possible to improve the simultaneity of image communication, and additionally even should a part of the INTER video data become corrupted, so that the INTER video data image displayed on the display 9 is disturbed, when subsequent INTRA video data is received, the image is restored to a normal image, so that the image on the display 9 is not disturbed over a long period of time.

The compressed audio data sent from the TV telephone apparatus 1A via the IP network 16, the network interface 15, and the IP section 14 and received in the UDP section 12 of the TV telephone apparatus 1 is UDP protocol processed by the UDP section 12 and outputs to the audio decompression section 4. The audio decompression section 4 performs audio decompression and decoding processing, thereby reproducing the audio signal.

The compression and encoding processing in the audio compression section 3 and the decompression and decoding processing in the audio decompression section 4 are performed in accordance with anyone of the ITU-T Recommendations G.711, H.722, H.723, G.728, and G.729.

The speaker 5 reproduces the audio signal output from the audio decompression section 4.

The video decompression section 8 performs addition of INTRA video data input to the TCP section 13 which performs TCP protocol processing, and INTER video data input to the UDP section 12 which performs UDP protocol processing, and further performs decompression and decoding processing of the added INTRA and INTER video data, thereby generating and outputting a video signal.

The interframe predictive encoding processing in the video compression section 7 and the decompression and decoding processing in the video decompression section 8 are performed in accordance with either of the ITU-T Recommendations H.261 and H.263.

The display 9 displays the video signal output from the video decompression section 8.

The IP section 14 performs IP protocol processing to compressed audio data and INTER video data output from the UDP section 12, INTRA video data and a call control signal output from the TCP section 13, and outputs the IP protocol processed compressed audio data, INTRA video data, INTER video data, and call control signal to the network interface 15.

The IP section 14 performs IP protocol processing of compressed audio data, INTRA video data, INTER video data, and a call control signal sent from the TV telephone apparatus 1A via the IP network 16 and the network interface 15, outputting the IP protocol processed compressed audio data and INTER video data to the UDP section 12, and outputting the IP protocol processed INTRA video data and call control signal to the TCP section 13.

The network interface 15 outputs compressed audio data, INTRA video data, INTER video data, and a call control signal from the IP section 14 to the TV telephone apparatus 1A, and outputs compressed audio data, INTRA video data, INTER video data, and a call control signal from the TV telephone apparatus 1A via the IP network 16 to the IP section 14.

Figure 3:
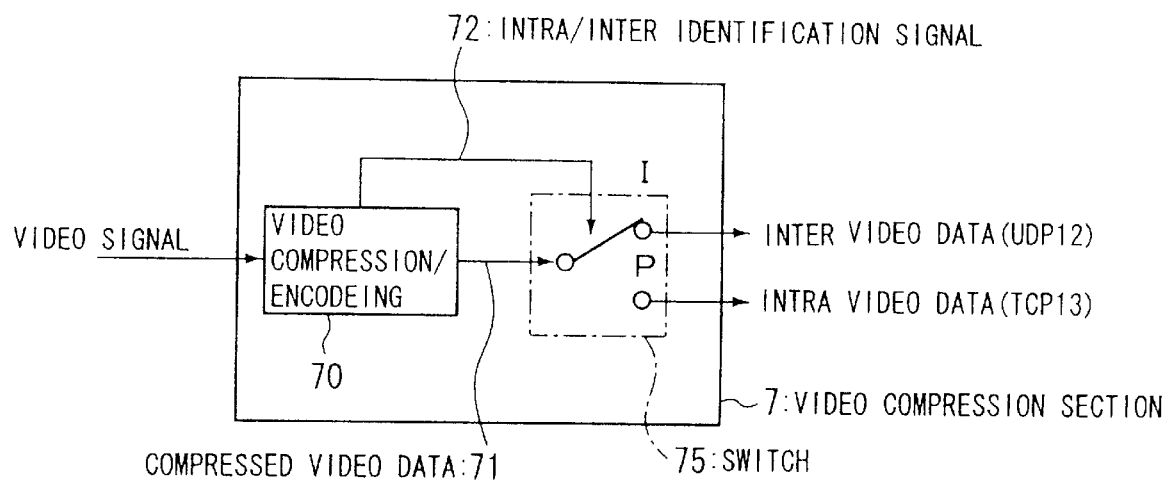
FIG. 3 is a drawing showing an example of the configuration of the video compression section shown in FIG. 2.

FIG. 3 shows an example of the configuration of the video compression section 7 of FIG. 2.

The video compression section 7 of FIG. 3 is formed by a video compression and encoding section 70, which performs interframe predictive encoding of a video signal captured by the video camera 6 so as to generate and output compressed video data 71 and an INTRA/INTER identification signal 72, and a switch 75, which, based on the INTRA/INTER identification signal 72 which is output from the video compression and encoding section 70, connects the video compression and encoding section 70 to either an I side (UDP section 12 side) or a P side (TCP section 13 side).

The video compression and encoding section 70, in the case in which INTRA video data 73 is generated as the compressed video data 71, outputs the INTRA/INTER identification signal 72 to the switch 75 for connecting the switch 75 to the P side. The video compression and encoding section 70, in the case in which INTER video data 74 is generated as the compressed video data 71, outputs the INTRA/INTER identification signal 72 to the switch 75 for connecting the switch 75 to the I side.

Figure 4:
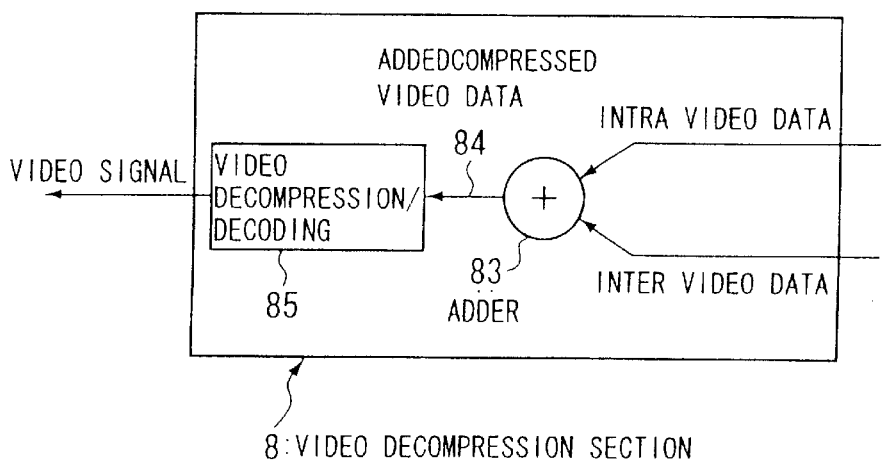
FIG. 4 is a drawing showing an example of the configuration of the video decompression section shown in FIG. 2.

FIG. 4 is a drawing showing an example of the configuration of the video decompression section 8 shown in FIG. 2.

The video decompression section 8 shown in FIG. 4 is formed by an adder 83, which performs addition processing of INTRA video data output from the TCP section 13 and INTER video data output from the UDP section 12, and outputs the added compressed video data 84, and a video decompression and decoding section 85, which performs decompression and decoding processing with respect to the added compressed video data 84 output from the adder 83, generating a video signal and outputting the video signal to the display 9.

The operation for performing communication using an audio signal and a video signal in a TV telephone apparatus as described above is described below. What is described is the communication operation at the TV telephone apparatus 1 for the case in which communication is performed with the TV telephone apparatus 1A, via the IP network 16.

First, a call connection by the call controller 11 to the TV telephone apparatus 1A, via the TCP section 13, the IP section 14, the network interface 15, and the IP network 16, is made.

When a call connection is established with the TV telephone apparatus 1A, the sections provided within the TV telephone apparatus 1A begin communication with TV telephone apparatus 1A using an audio signal and a video signal.

The operation of the audio signal communication is as follows.

When an audio signal and a video signal are sent to the TV telephone apparatus 1A, the audio signal captured by the microphone 2 is subjected to compression and encoding at the audio compression section 3, thereby generating a compressed audio signal, which is output to the UDP section 12.

In the UDP section 12, UDP protocol processing is performed on the compressed audio signal output from the audio compression section 3, and additionally, in the IP section 14, the compressed audio signal that has been performed of UDP protocol processing by the UDP section 12 is performed IP protocol processing.

After the above is done, the compressed audio data that has been performed of IP protocol processing by the IP section 14 is sent to the TV telephone apparatus 1A, via the network interface 15 and the IP network 16.

As described above, in the present invention, after the audio signal captured by the microphone 2 is compressed and encoded by the audio compression section 3, UDP protocol processing is performed on the signal by the UDP section 12, and further IP protocol processing is performed on the signal by the IP section 14, the resulting signal being sent to the TV telephone apparatus 1A as compressed audio data.

In the case in which compressed audio data sent from the TV telephone apparatus 1A is to be reproduced, compressed audio data is received by the network interface 15 from the TV telephone apparatus 1A, via the IP network 16. In the IP section 14, IP protocol processing is performed on the compressed audio data received in the network interface 15, and then UDP protocol processing is performed by the UDP section 12 on the data that has been performed of IP protocol processing in the IP section 14.

In the audio decompression section 4, compressed audio data that has been performed of UDP protocol processing by the UDP section 12 is decompressed and decoded, thereby generating an audio signal that is output to the speaker 5.

After the above, the speaker 5 reproduces the audio signal output from the audio decompression section 4.

The operation occurring when communication with a video signal is as follows.

When a video signal captured by the video camera 6 is to be sent to the TV telephone apparatus 1A, in the video compression section 70 provided within the video compression section 7, interframe predictive encoding is performed on the video signal captured by the video camera 6, thereby generating and outputting compressed video data 71, which is either INTRA video data not including interframe predictive coding signal or INTER video data including interframe predictive coding signal.

When the above is done, in the video compression section 70, if the generated compressed video data 71 is INTRA video data, an INTRA/INTER identification signal 72 for connecting the switch 75 to the P side (TCP section 13 side) is output to the switch 75, and if the generated compressed video data 71 is INTER video data, an INTRA/INTER identification signal 72 for connecting the switch 75 to the I side (UDP section 12 side) is output to the switch 75.

By doing the above, if INTRA video data is generated by the video compression and encoding section 70, the switch 75 is connected to the P side, so that the INTRA video data is output to the TCP section 13, but if INTER video data is generated by the video compression and encoding section 70, the switch 75, is connected to the I side, so that the INTER video data is output to the UDP section 12.

If INTRA video data is generated at the video compression and encoding section 70, the INTRA video data output from the video compression and encoding section 70 is subjected to TCP protocol processing by the TCP section 13, and then IP protocol processed by the IP section 14.

After the above, the INTRA video data that is IP protocol processed by the IP section 14 is sent to the TV telephone apparatus 1A, via the network interface 15 and the IP network 16.

If INTER video data is generated at the video compression and encoding section 70, the INTER video data output from the video compression and encoding section 70 is subjected to UDP protocol processing by the UDP section 12, and then IP protocol processed by the IP section 14.

After the above, the INTER video data that is IP protocol proceeed by the IP section 14 is sent to the TV telephone apparatus 1A, via the network interface 15 and the IP network 16.

In the present invention, in the case in which the video compression and encoding section 70 generates INTRA video data, the INTRA video data is subjected to TCP protocol processing by the TCP section 13 and then IP protocol processed by the IP section 14, after which it is output to the TV telephone apparatus 1A as TCP data, and in the case in which the video compression and encoding section 70 generates INTER video data, the INTER video data is subjected to UDP protocol processing by the UDP section 12 and then IP protocol processed by the IP section 14, after which it is output to the TV telephone apparatus 1A as UDP data.

In the case in which INTRA video data and INTER video data are received as TCP data and UDP data from the TV telephone apparatus 1A, respectively, INTRA video data and INTER video data sent from the TV telephone apparatus 1A via the IP network 16 are received in the network interface 15.

In the case in which INTRA video data is received in the network interface 15, the INTRA video data received in the network interface 15 is IP protocol processed by the IP section 14 and then TCP protocol processing is performed by the TCP section 13, after which the TCP protocol processed INTRA video data is output to the video decompression section 8.

In the case in which INTER video data is received in the network interface 15, the INTER video data received in the network interface 15 is subjected to UDP protocol processing by the UDP section 12, after which the UDP protocol processed INTER video data is output to the video decompression section 8.

In the adder 83 provided within the video decompression section 8, INTRA video data output from the TCP section 13 and INTER video data output from the UDP section 12 are added, the added compressed video data 84 being output to the video decompression and decoding section 85.

In the video decompression and decoding section 85, the added compressed video data 84 output from the adder 83 is subjected to interframe predictive decoding, thereby generating a video signal.

After the above, the display device displays the video signal output from the video decompression and decoding section 85.

By the above-described operation, it is possible to achieve mutual communication with an audio signal and a video signal between the TV telephone apparatuses 1 and 1A.

The condition of the image displayed at a TV telephone apparatus according to the present invention is described below.

Figure 5:
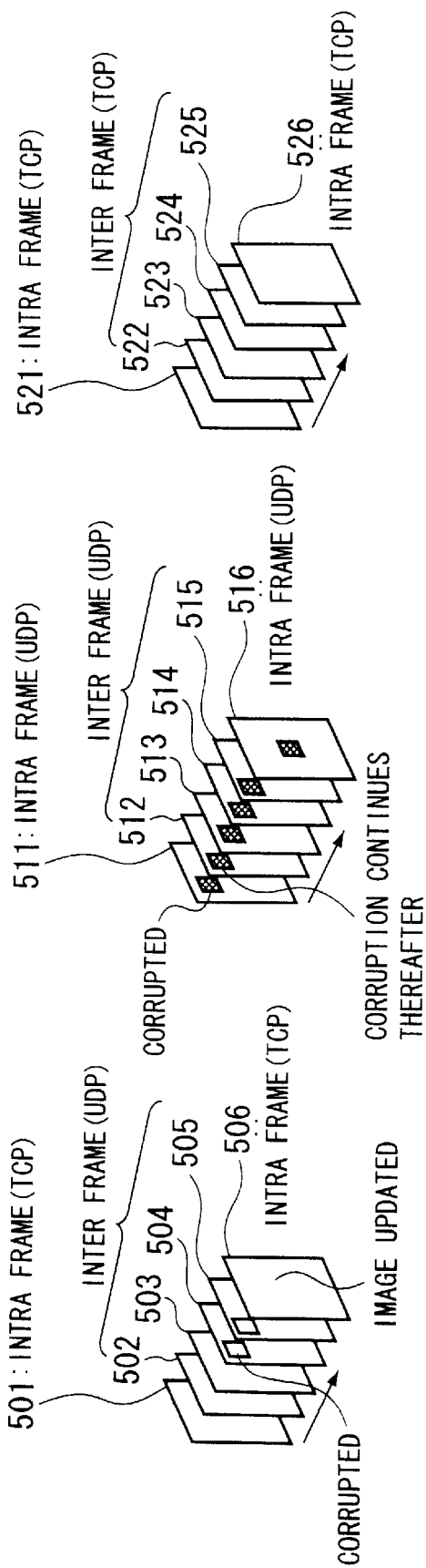

FIG. 5 is a drawing illustrating the condition of the image in a TV telephone apparatus, FIG. 5(*a*) illustrating the condition of the image displayed on the TV telephone apparatus of FIG. 2, FIG. 5(*b*) illustrating the condition of the image displayed on a TV telephone apparatus used in TV telephone system of the past, and FIG. 5(*c*) illustrating the condition of the image displayed on a TV telephone apparatus in the case in which communication of INTRA video data and INTER video data between TV telephone apparatuses are both conducted using the TCP protocol.

In FIG. 5, INTRA video data and INTER video data are received at a TV telephone apparatus as INTRA frame data and INTER frame data, respectively.

First, the condition of the image displayed at the TV telephone apparatus according to the present invention shown in FIG. 2 will be described, with reference made to FIG. 5(*a*).

In the TV telephone apparatus shown in FIG. 2, because communication is performed with INTER frame data, using the UDP protocol, and with INTRA frame data, using the TCP protocol, when communication is done with INTRA frame data, error correction and resend control are performed by the TCP protocol.

By doing this, because the INTRA frame data 501 received first is not corrupted, and because the decompression and decoding processing of the INTRA frame data 501 is performed without referencing a previous frame of data, by using only the current frame data, there is no disturbance to the display of the INTRA frame data 501 at the TV telephone apparatus.

In the case in which the INTRA frame data 501 displayed at the TV telephone apparatus is a normal image without disturbance, because the decompression and decoding processing with respect to the subsequent INTER frame data 502 and 503 is performed by referencing the INTRA frame data 501 of the previous frame, if the INTER frame data 502 and 503 are received in uncorrupted form, the INTER frames 502 and 503 are displayed without disturbance.

In the case in which the next received INTER frame 504 is received in corrupted form, the INTER frame data 504 image displayed at the TV telephone apparatus will be disturbed, and the image of the next received INTER frame data 505 will continue to be corrupted.

However, because the next INTRA frame data 506 is received uncorrupted, the image of INTRA frame data 506 displayed at the TV telephone apparatus is updated to a normal image.

In contrast to this, in a TV telephone apparatus used in a TV telephone system of the past, because INTRA frame data and INTER frame data communication are both performed using the UDP protocol, as shown in FIG. 5(*b*), there exists the case in which the first received INTRA frame data 511 is corrupted.

In the case in which part of the INTRA frame data 511 is corrupted when it is received, there is a great disturbance in the image displayed at the TV telephone apparatus.

In the case in which the image of the INTRA frame data 511 at the TV telephone apparatus is disturbed, because the decompression and decoding processing of the next received INTER frame data 512 to 515 are performed by referencing the previous INTRA frame data 511, the images at the TV telephone apparatus from the INTER frame data 512 to 515 will continue to be disturbed.

In the case in which the next received INTRA frame data 516 is received uncorrupted, the image displayed at the TV telephone apparatus is updated to a normal image.

However, there is the case in which part of the INTRA frame data 516 is corrupted when received, and if this occurs, the image at the TV telephone apparatus will continue to be disturbed.

Therefore, in the time during which subsequent INTRA frame data (not shown in the drawing) is corrupted, the image displayed at the TV telephone apparatus will continue to be disturbed, the result being that the displayed image is disturbed for a long period of time.

In a TV telephone apparatus in which communication of INTRA frame data and INTER frame data are both done using the TCP protocol, error correction and resend control are performed when conducting communication of INTRA and INTER frame data.

For this reason, as shown in FIG. 5(c), INTER frame data 521 and 526 and INTER frame data 522 to 525 are received uncorrupted, so that there is no disturbance in the image at the TV telephone apparatus for the INTRA frame data 521 and 526 and the INTER frame data 522 to 525.

However, because communication of both the INTRA frame data 521 and 526 and the INTER frame data 522 to 525 is performed using the TCP protocol, there is loss of simultaneity in the image communication.

In the present invention as described above, because INTRA frame data communication is performed using the TCP protocol, there is no corruption of data when the INTRA frame data is received, and no disturbance to the image displayed at the TV telephone apparatus from the received INTRA frame data.

For this reason, even in the case in which the image displayed at the TV telephone apparatus is temporarily disturbed when INTER frame data is received, when a subsequent INTRA frame data is received, the image display at the TV telephone apparatus is updated to a normal image, so that there is not a disturbance of the image over a long period of time.

Additionally, because INTER frame data communication is done using the UDP protocol, compared to the case in which communication using both INTRA frame data and INTER frame data is performed using the TCP protocol, there is an improvement in the simultaneity of the image communication.

The foregoing embodiment of the present invention was described for the case in which interframe predictive encoding is performed on a video signal. However, it will be understood that the present invention can also take on a configuration in which INTRA macroblock data and INTER macroblock data are generated by frame differential image encoding of a video signal, wherein INTRA macroblock data communication is performed using the TCP protocol and INTER macroblock data communication is performed using the UDP protocol.

In the case of performing communication between TV telephone apparatuses using a video signal and an audio signal, as described in detail above, because INTRA video data generated by intertrame predictive encoding of a video signal is communicated using the TCP protocol, so that error correction and resend control are performed when INTRA video data is communicated, thereby enabling reception of INTRA video data without corruption and without disturbance to the displayed image. Because the decompression and decoding processing of the INTRA video data is done without referencing the data of a previous frame, it is possible to prevent the disturbance of the image displayed.

Additionally, in the case in which inter video data is communicated using the UDP protocol, it is possible to improve the simultaneity of image communication, and, even if part of the INTER video data is corrupted, so that the resulting image is disturbed, when the next INTRA video data is received, the displayed image is updated to a normal image, making it possible to prevent disturbance of the displayed image over a long period of time.

What is claimed is:

1. A TV telephone system in which encoding processing is preformed on an audio signal so as to generate compressed audio data, and interframe predictive encoding processing is preformed on a video signal, so as to generate INTRA (intraframe coding) video data not including interframe predictive coding signal and INTER (interframe coding) video data including interframe predictive coding signal, said system having a plurality of TV telephone apparatuses which perform communication with each other, via an IP (internet protocol) network, using said compressed audio data, INTRA video data and INTER video data, wherein said plurality of TV telephone apparatuses of said TV telephone system perform INTRA video data communication using the transfer control protocol (TCP), wherein each of said TV telephone apparatuses comprises:

a microphone for capturing said audio signal;

an audio signal compression section which generates said compressed audio data by performing audio compression and encoding of said audio signal captured by said microphone;

a video camera for capturing a video signal;

a video signal compression section which generates both said INTRA video data and said INTER video data by performing interframe predictive encoding for each frame of said video signal captured by said video camera;

a UDP (user datagram protocol) section which performs UDP protocol processing of said compressed audio data output from said audio signal compression section, and which performs UDP protocol processing of INTER video data output from said video signal compression section, and which performs UDP protocol processing of a compressed audio data and INTER video data received via said IP network;

a TCP (transmission control protocol) section which performs TCP protocol processing of said INTRA video data output from said video signal compression section, and which performs TCP protocol processing of an INTRA video data received via said IP network;

an IP section which performs IP protocol processing of said compressed audio data and said INTER video data output from said UDP section and said INTRA video data output from said TCP section, and which performs IP protocol processing of said compressed audio data, said INTRA video data, and said INTER video data received via said IP network and output said compressed audio data and said INTER video data received via said IP network to said UDP section and output said INTRA video data received via said IP network to said TCP section; and a video decompression section which performs decompression and decoding of said INTER video data output from said UDP section and said INTRA video data output from said TCP section.

2. A TV telephone system according to claim 1, wherein said video signal compression section comprises:

a video compression and encoding section, which performs interframe predictive encoding for each frame of said video signal captured by said video camera, thereby generating and outputting either INTRA video data or INTER video data, and which also outputs an INTRA/INTER identification signal, in synchronization with a generation of said INTRA video data and said INTER video data; and a switch, which, in response to said INTRA/INTER identification signal, causes INTRA video data output to said TCP section and causes INTER video data output to said UDP section.

3. A TV telephone system according to claim 1, wherein said video decompression section comprises:

an adder, in which said INTRA video data output from said TCP section and INTER video data output from said UDP section are added; and a video decompression and decoding section, which performs decompression and decoding of said INTER video data and said INTRA video data added by said adder, so as to reproduce a video signal.

4. A TV telephone apparatus in which encoding processing is preformed on an audio signal so as to generate compressed audio data, and interframe predictive encoding processing is preformed on a video signal, so as to generate INTRA (intraframe coding) video data not including interframe predictive coding signal and INTER (interframe coding) video data including interframe predictive coding signal, wherein said TV telephone apparatus comprises:

a microphone for capturing said audio signal;

an audio signal compression section which generates said compressed audio data by performing audio compression and encoding of said audio signal captured by said microphone;

a video camera for capturing a video signal;

a video signal compression section which generates both said INTRA video data and said INTER video data by performing interframe predictive encoding for each frame of said video signal captured by said video camera;

a UDP (user datagram protocol) section which performs UDP protocol processing of said compressed audio data output from said audio signal compression section, and which performs UDP protocol processing of INTER video data output from said video signal compression section, and which performs UDP protocol processing of a compressed audio data and INTER video data received via an IP network;

a TCP (transmission control protocol) section which performs TCP protocol processing of said INTRA video data output from said video signal compression section, and which performs TCP protocol processing of an INTRA video data received via said IP network;

an IP section which performs IP protocol processing of said compressed audio data and said INTER video data output from said UDP section and said INTRA video data output from said TCP section, and which performs IP protocol processing of said compressed audio data, said INTRA video data, and said INTER video data received via said IP network and output said compressed audio data and said INTER video data received via said IP network to said UDP section and output said INTRA video data received via said IP network to said TCP section; and a video decompression section which performs decompression and decoding of said INTER video data output from said UDP section and said INTRA video data output from said TCP section.

5. A TV telephone apparatus according to claim 4, wherein said video signal compression section comprises:

a video compression and encoding section, which performs interframe predictive encoding for each frame of a video signal captured by said video camera, thereby generating and outputting either INTRA video data or INTRA video data, and which also outputs and INTRA/INTER identification signal, in synchronization with a generation of said INTRA video data and said INTER video data; and a switch, which, in response to said INTRA/INTER identification signal, causes INTRA video data output to said TCP section and causes INTER video data output to said UDP section.

6. A TV telephone apparatus according to claim 4, wherein said video decompression section comprises:

an adder, in which said INTRA video data output from said TCP section and INTER video data output from said UDP section are added; and a video decompression and decoding section, which performs decompression and decoding of said INTER video data and said INTRA video data added by said adder, so as to reproduce a video signal.

* * * * *